(12) United States Patent
Tremblay et al.

(10) Patent No.: US 6,736,274 B2
(45) Date of Patent: May 18, 2004

(54) NONWOVEN TUBULAR FILTER EXTRACTING

(75) Inventors: Maurice H. Tremblay, Haverhill, MA (US); Andrew B. Tremblay, Windham, NH (US)

(73) Assignee: Total Filter Technology, Inc., North Chelmsford, MA (US)

( * ) Notice: Subject to any disclaimer, the term of this patent is extended or adjusted under 35 U.S.C. 154(b) by 0 days.

(21) Appl. No.: 09/932,203

(22) Filed: Aug. 17, 2001

(65) Prior Publication Data

US 2003/0034296 A1 Feb. 20, 2003

(51) Int. Cl.⁷ .............................................. B01D 39/16
(52) U.S. Cl. .................... 210/496; 210/497.1; 428/36.1; 428/170; 428/171; 442/400
(58) Field of Search ..................... 210/496, 497.01, 210/497.1, 497.2; 55/528; 428/36.3, 35.7, 36.1, 36.9, 36.91, 36.92, 132, 137, 170, 171, 172, 173; 442/400

(56) References Cited

U.S. PATENT DOCUMENTS

| | | |
|---|---|---|
| 1,392,989 A | 10/1921 | Van Nostrand et al. |
| 1,533,345 A | 4/1925 | Smith |
| 2,337,758 A | 12/1943 | Loewy |
| 2,847,086 A | 8/1958 | Müller |
| 3,137,611 A | 6/1964 | Krolik, Jr. |
| 3,592,769 A * | 7/1971 | Decker ........................ 210/491 |
| 3,674,599 A | 7/1972 | Wiltshire |
| 3,787,265 A | 1/1974 | McGinnis et al. |
| 3,796,617 A | 3/1974 | Wiltshire |
| 3,867,294 A * | 2/1975 | Pall et al. ..................... 210/489 |
| 3,890,681 A | 6/1975 | Fekete et al. |
| 3,904,798 A | 9/1975 | Vogt et al. |
| 3,933,557 A | 1/1976 | Pall |
| 4,116,738 A | 9/1978 | Pall |
| 4,240,864 A | 12/1980 | Lin |
| 4,784,892 A * | 11/1988 | Storey et al. ................ 428/172 |
| 4,847,125 A | 7/1989 | Schwarz |
| 4,863,603 A | 9/1989 | Lehmann et al. |
| 5,340,479 A | 8/1994 | Szczepanski et al. |
| 5,366,576 A | 11/1994 | Clack |
| 5,409,642 A | 4/1995 | Allen et al. |
| 5,591,335 A * | 1/1997 | Barboza et al. .......... 210/323.2 |
| 6,391,200 B2 * | 5/2002 | Pulek et al. ............. 210/497.1 |

* cited by examiner

*Primary Examiner*—Matthew O. Savage
(74) *Attorney, Agent, or Firm*—Fish & Richardson, P.C.

(57) ABSTRACT

A method of continuously manufacturing tubular filter products includes rotating a mandrel in a first rotational direction, depositing nonwoven fibers on the mandrel to form a tube and continuously withdrawing the tube from the mandrel by engaging a peripheral surface of the tube with one or more detents extending radially from a surface of a roller. The roller rotates in a direction opposite the first rotational direction as the one or more detents engage the tube to a predetermined depth relative. For carrying out such a method, an apparatus includes a melt blowing die assembly for expelling melt blown fibers, a rotating mandrel arranged to receive the melt blown fibers from the melt blowing die assembly for allowing the melt blown fibers to accumulate in a body thereon and a rotating roll having a pattern of protruding detents. The roll is arranged so that at least some of the detents will come within a predetermined distance of the mandrel for contacting the melt blown fibers in a manner forcing the melt blown fibers accumulated on the mandrel to move in a direction parallel to the mandrel. A tubular filter product includes a plurality of melt blown fibers in a body defining an outer surface and an inner surface, the body defining a pattern of cavities between the outer surface and the inner surface.

5 Claims, 3 Drawing Sheets

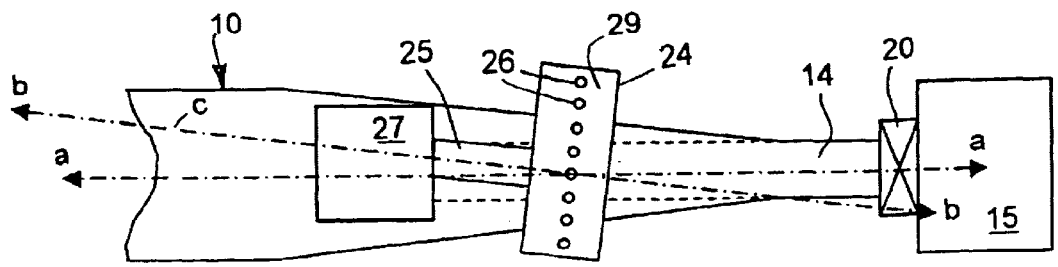
FIG. 3
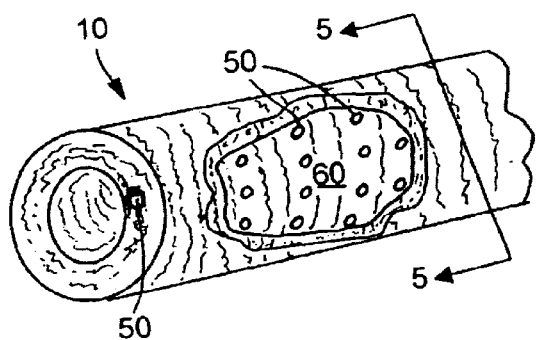
FIG. 4
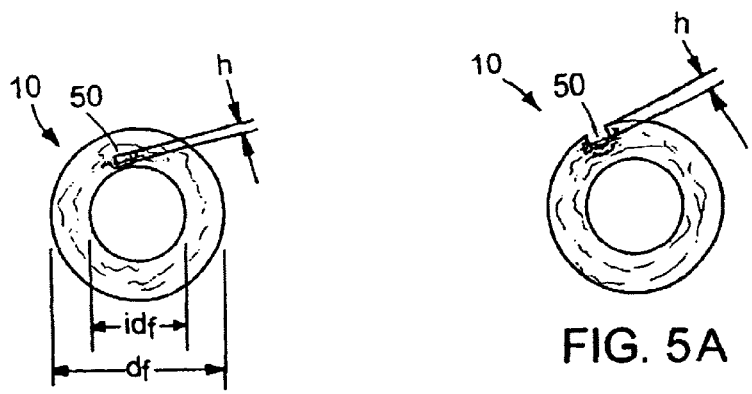
FIG. 5
FIG. 5A

NONWOVEN TUBULAR FILTER EXTRACTING

TECHNICAL FIELD

The invention relates to nonwoven filter products and methods and apparatus for their manufacture. More particularly, the invention relates to methods and apparatus useful in manufacturing nonwoven filter products and nonwoven tubular filter products produced continuously thereby.

BACKGROUND

Various filter products are continuously manufactured and subsequently cut to desired sizes, shapes, and/or lengths for particular filter applications. One particular type of filter product is produced continuously in a tubular shape by depositing fibers onto a mandrel. A die is positioned adjacent the mandrel and fibers are fed through the die to contact the mandrel. Typically, the mandrel is rotated while initially deposited fibers contact the mandrel surface forming an inner diameter of the filter product. Subsequently deposited fibers form layers upon the initially deposited fibers, thereby building filter thickness radially outward to an exposed outer surface of predetermined diameter. Meanwhile, the filter product is either continuously or incrementally extracted from the mandrel to expose the mandrel surface for receiving additional fibers. In this manner, the tubular filter product is continuously produced.

Such tubular filter products have many uses. For example, in many chemical and beverage processing operations, tubular filter are used to remove particulate matter from liquids by passing the liquid around the outside of the tubular filter product while forcibly drawing the liquid from the inside of the tubular filter product. In this manner, the liquid is forced through the tubular filter, i.e., toward its inner diameter, the filter acting to trap the particulates while allowing the liquid to pass through to the open center. Of course, in other applications the process is reversed and the liquid/particulate solution is introduced in the open center of the tubular filter and forced outward through the filter to the outer diameter of the tube.

In one technique for manufacturing such filter products, the tubular body of the filter is contacted upon its outer surface by the smooth outer surface of a driven roll. The roll is driven in a direction opposite to the rotation of the mandrel such that friction between the roll outer surface and filter product causes the filter product to also rotate in a direction opposite rotation of the mandrel. In this manner, the filter product is continuously extracted from the mandrel.

SUMMARY

In one aspect, the invention provides a method for manufacturing tubular filter products. The method includes rotating a mandrel in a first rotational direction, depositing nonwoven fibers onto the mandrel to form a tubular body, and continuously withdrawing the tubular body from the mandrel by engaging a peripheral surface of the tubular body with one or more detents extending radially from an opposed surface of a roller. The roller rotates in a direction substantially opposite the rotational direction of the mandrel as one or more detents engage the periphery of the tube to a predetermined depth.

Variations of this aspect of the invention may include one or more of the following features. The peripheral surface comprises the outer surface of a fully formed tubular body. The method further includes covering the peripheral surface with additional nonwoven fibers. The roller includes multiple detents. The multiple detents extend radially to equal distances from the surface of the roller. The multiple detents are uniformly distributed about the roller.

In another aspect, the invention provides a tubular filter product including a plurality of melt blown fibers interengaged to form a tubular body defining an outer surface and an inner surface, the tubular body further defining a pattern of cavities.

Variations of this aspect of the invention can include one or more of the following features. The cavities are enclosed between melt blown fibers of the outer surface and the inner surface. The cavities are exposed recesses extending into one of said inner and outer surfaces. Localized areas corresponding to the recesses are of greater melt blown fiber density per unit volume than an average melt blown fiber density per unit volume associated with the tubular filter product.

In another aspect, the invention-provides an apparatus for continuously producing a tubular filter product. The apparatus includes a melt blowing die assembly for expelling melt blown fibers, a rotating mandrel arranged to receive the melt blown fibers from the melt blowing die assembly for allowing the melt blown fibers to accumulate in a tubular body thereon, and a rotating roll having an outer surface with at least one detent protruding therefrom, the roll arranged so that said detent comes within a predetermined distance of the mandrel for contacting the tubular body of melt blown fibers in a manner forcing the melt blown fibers accumulated in the tubular body on the mandrel to move in a direction parallel to the mandrel.

Variations of this aspect of the invention may include one or more of the following features. The rotating mandrel extends adjacent the melt blowing die assembly to define a fiber receiving portion of the mandrel and the rotating roll is arranged to contact the tubular body at a location corresponding to the fiber receiving portion. The rotating roll has a plurality of detents protruding from its outer surface. The detents are uniformly distributed about the outer surface of the roller.

The method and apparatus provide many advantages over other techniques for manufacturing filter products. For example, great control over the filter-making process and great design flexibility for producing tubular filters having desirable characteristics because the many variables involved in the manufacturing process can be pre-selected and varied as desired. Such variables include, for example, the pre-set shortest distance between the tips of the detents and the mandrel; the outer diameter of the filter product at the point of contact with the detents, which, in turn, is dependent on the feed rate of fibers from the die, the rotational speed of the mandrel and the relative placement of the roll relative to the die; the rotational velocity and cant angle of the roll relative to the mandrel, and the rotational velocity of the mandrel. Thus, the method and apparatus provide for great control over the filter-making process and great design flexibility for producing tubular filters having desirable characteristics. Furthermore, the process of removing the filter product from the mandrel provides an easy and simple means of starting the filter making process without the need for additional equipment and starter pieces as are necessary in various known systems.

The filter products manufactured by the disclosed method and apparatus also offer many advantages over other filter products. For example, the cavities formed in the filter product provide for enhanced filtration characteristics. These cavities have been shown to provide bypass areas for fluid to pass further into the depth of the filter and provide areas for increased amounts of sediment to collect, thereby increasing the overall sediment (e.g., dirt) holding capacity of the filter proportionally by the number, size and shape of the cavities created during processing. Additionally, the penetration of detents into filter product locally compresses the affected fibers against one another. This compressing action increases the overall collapse strength of the filter product by interlocking the affected fibers of the various layers penetrated by the detents as well as closely adjacent fibers.

DESCRIPTION OF DRAWINGS

FIG. 3 is a schematic diagram of the method and apparatus of FIG. 1 taken in the direction of arrows 3—3.

FIG. 4 is an unscaled perspective view of a tubular filter product produced by the method and apparatus of FIG. 1.

FIG. 5 is an unscaled cross-sectional view taken along line 5—5 of FIG. 4.

FIG. 5A is a view similar to that of FIG. 5, illustrating an alternative filter product of the invention.

Like reference symbols in the various drawings indicate like elements.

DETAILED DESCRIPTION

Figure 1:
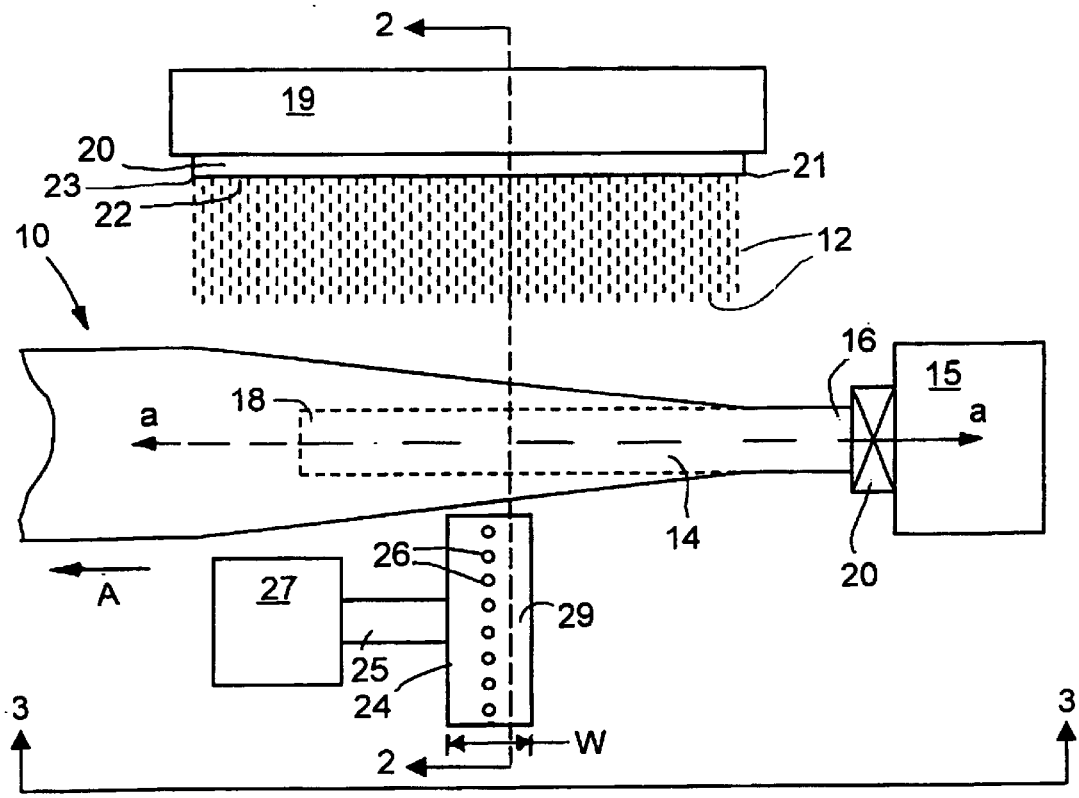
FIG. 1 is a schematic diagram illustrating a method and apparatus for producing a nonwoven tubular product of the invention.
Figure 2:
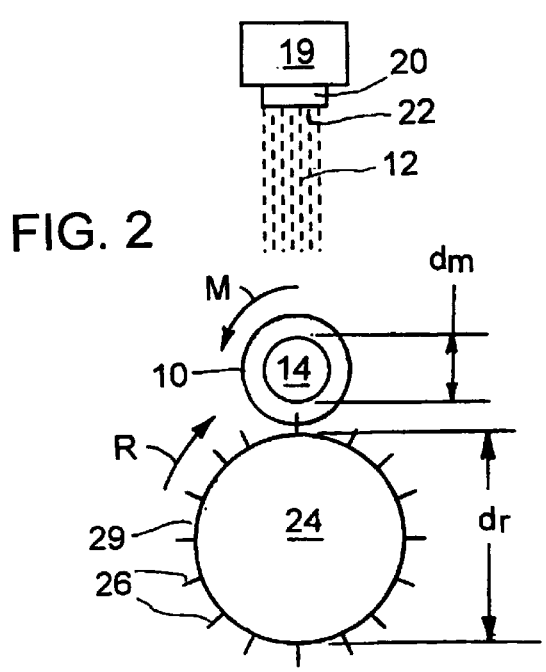
FIG. 2 is a schematic cross-sectional view of the method and apparatus of FIG. 1 taken along lines 2—2 of FIG. 1.

Referring to FIGS. 1–3, a tubular filter product 10 is continuously produced by depositing, e.g., melt blowing, nonwoven fibers 12 onto a rotating mandrel 14 or a similarly arranged tubular support core. As fibers 12 accumulate on mandrel 14, filter product 10 is simultaneously moved, as further described below, in an axial direction (indicated by arrow A in FIG. 1), thus allowing for continuous manufacture of the filter product.

Mandrel 14 extends axially (axis a—a) between a proximal end 16 and a distal end 18. Bearing 20, located near proximal end 16 supports the mandrel, which is rotatably driven in the direction of arrow M by a motor (not shown) engageably coupled to mandrel 14 also near proximal end 16. The mandrel is typically of steel, aluminum, steel alloys, polyfluoromer resins, or any other suitable material. Hollow shafts with varying inner diameters and shafts with varying outer diameters are also suitable. In one example, the mandrel is a solid stainless steel (ASTM Type 304) rod having a one inch outer diameter, $d_m$.

Mandrel 14 is part of a mandrel assembly 15 including bearings, pulleys, a belt, motor and controls (none of which are illustrated in the figures). The various components are chosen as necessary to rotate mandrel 14 at a suitable speed for production of tubular filter product 10. Typically, a mandrel speed between about 50 and 2000 rpm is appropriate.

A die 20 is arranged adjacent mandrel 14 such that a longitudinally oriented, fiber-expelling surface 22 of die 20 faces mandrel 14 with the length of surface 22 being relatively parallel to axial direction A. Surface 22 has a proximal edge 21 and a distal edge 23, the proximal edge being located relatively closer to proximal end 16 of mandrel 14 than distal end 23. Die 20 is part of a conventional melt blowing assembly 19, including a manifold, melt pump, inline heaters and other controls and motors, none of which are illustrated in the figures. These components enable die 20 to expel melt blown fibers 12 through surface 22 onto mandrel 14. While multiple dies and/or melt blowing assemblies can be employed to deliver fibers to mandrel 14 as desired, in one suitable example, die 20 is a single die unit with a 10 inch long fiber-expelling surface 22 and is part of a melt blowing assembly capable of delivering fibers at a rate of 100–450 grams per minute.

One suitable material choice for fibers 12 is a polypropylene resin such as that sold under the designation HH442H and available from Montell Corporation of Wilmington, Del., USA. However, other grades of polypropylene or thermal plastic resin suitable for melt blowing are also suitable for use with the invention.

A cylindrical roll 24 for extracting filter product 10 from mandrel 14 is also placed adjacent mandrel 14. Roll 24 has a row of detents or pins 26 evenly spaced about and protruding from its outer radial surface 20. In one example, roll 24 is of aluminum and has a diameter, $d_r$, of 4.5 inches and a width, W, of 2.0 inches. In this example, roll 24 has thirty (30) steel pins 26 protruding from its outer radial surface 29, each pin being of cylindrical shape and having a diameter of 0.062 inch and an overall length of 1.0 inch. Steel pins 26 are evenly spaced around the outer periphery or roll 24, but are pressed into the roll so that each pin protrudes from the outer radial surface of the roll to a distance of 0.5 inch. Other sizes, shapes and materials for roll 24 and pins 26 may be used in a similar fashion. Similarly, the number, spacing, and shape of the pins may also be varied. Furthermore, multiple rolls 24 or a single roll having multiple rows of pins 26 may be employed.

Roll 24 is part of a roller assembly including a centrally coupled shaft 25 driven by a motor system 27 to rotate roll 24 in the direction of arrow R, a direction having a significant component oriented opposite to the direction of the mandrel rotation (arrow M). Roll 24 is spaced from mandrel 14 such that rotation of the roll will not cause pins 26 to contact mandrel 14, but will cause pins 26 to contact filter product 10 to a desired depth from its outer surface. The speed of rotation of roll 24 is coordinated with the speed of rotation of mandrel 14 as desired to produce tubular filter product 10 at the desired speed.

In one example, roll 24 is located generally on the opposite side of the mandrel from die 22, while longitudinally, roll 24 is located such that pins 26 contact filter product 10 at a location relatively proximal of distal edge 23 of die portion 22 (illustrated example of FIGS. 1 and 3). With the roll in this location, die 20 will continue to deposit fibers onto the tubular filter product after the roll has contacted and moved the filter product distally as described below. However, roll 24 can be located at nearly any position along the length of mandrel 14, including a location that causes pins 26 to contact filter product 10 at a point where it has accumulated fibers sufficient to reach its full outer diameter, $d_f$ (FIG. 5). In other words, roll 24 can be positioned so that pins 26 contact filter product 10 at a point distal along axis a-a relative to distal edge 23 of die surface 22.

Roll 24 is typically canted such that its rotational axis b—b is at an angle c (FIG. 3) relative to axis a—a of mandrel 14. In one example, angle c is selected to be 3.5°, however any angle within the range of about 1° to about 45° may be employed. The spacing between mandrel 14 and roll 24 can also be selected as necessary depending on the desired depth of penetration of pins 26 into filter product 10. However, sufficient spacing is normally maintained to avoid contacting pins 26 with mandrel 14. In one example, roll 24 is located relative to mandrel 14 such that the tips of pins 26 come as close as 0.125 inch of the mandrel's outer surface.

The operation of the apparatus will now be described with reference to a particular example of the various design parameters described above. To begin operation of the apparatus, mandrel 14 is driven to rotate in the direction of arrow M as described above. In this example, a mandrel speed of 100 rpm is chosen. Subsequently, fibers 12 are expelled through fiber-emitting surface 22 of die 20 toward rotating mandrel 14. In this example, the fibers are introduced at a rate of 170 grams per minute. Meanwhile, roll 24 is driven to rotate in the direction of arrow R as described above. In this example, roll 24 is dimensioned as described above having pins 26 protruding 0.5 inch from its outer surface. The roll is positioned along axis a—a at a point where its outer radial surface nearly contacts the fibers of the forming filter product. The roll is driven to rotate at a speed of 21 rpm and is arranged so the tips of pins 26 are approximately 0.125 inch from mandrel 14 at their nearest point. As fibers 12 accumulate on mandrel 12 to a thickness equaling the pre-selected smallest distance between the tips of pins 26 of rotating roll 24 and mandrel 14 (0.125 inches in this example), pins 26 begin to contact fibers 12. Each successive pin 26 of roll 24 contacts fibers 12 of filter product 10 penetrating into fibers 12 and urges the filter product axially (direction of arrow A in FIG. 1) along mandrel 14. Subsequent to the penetration of the forming filter product by pins 26, die 20 continues to add fibers to the penetrated portion of filter product 10 until it passes distally beyond the die. In this manner, fully formed portions of filter product 10 are extracted from distal end 18 of mandrel 14 to be cut to desired sizes or accumulated for later processing.

In the example described immediately above, the process yields a tubular filter product 10 having an outer diameter, $d_p$, of 2.5 inches, an inner diameter, $id_p$, of 1.0 inch and a weight of 130–180 grams per ten inches of length. Filter product 10 is removed from mandrel 14 at a rate of approximately 13 inches per minute. Of course, as discussed above, the removal rate is dependent upon many factors and can be varied as desired. Typically, a removal rate of between 5 and 30 inches per minute is desirable, however faster and slower rates are also possible.

The penetration of pins 26 into filter product 10 is determined by a number of factors, including: the pre-set shortest distance between the tips of pins 26 and mandrel 14; the outer diameter of filter product 10 at the point of contact with pins 26, which, in turn, is dependent on the feed rate of fibers from die 22, the rotational speed of mandrel 14 and the relative placement of roll 24 relative to die 22; the rotational velocity and cant angle, c, of roll 24, and the rotational velocity of mandrel 14. Because all of these variables can be pre-selected and varied as desired, the apparatus provides for great control over the filter-making process and great design flexibility for producing tubular filters having desirable characteristics. Furthermore, this process of removal of the filter product from the mandrel provides an easy and simple means of starting the filter making process without the need for additional equipment and starter pieces as are necessary in various known systems.

Referring now to FIGS. 4 and 5, the penetration of pins 26 into filter product 10 creates a series of cavities 50 that are not readily visible from the outer surface of filter product 10, if, as in the example described above, roll 24 is arranged so that pins 26 contact the filter product before it has been formed to its full outer diameter, $d_p$. In other words, the additional layers of fibers that accumulate on filter product 10 after pins 26 have penetrated and axially moved the product along the mandrel tend to cover the initially exposed recesses. Therefore, FIG. 4 illustrates a portion 60 with outer layer of fibers 12 cut away from filter product 10 to reveal the pattern of internal cavities 50. Of course, if roll 24 is arranged to contact filter product 10 distally of distal edge 23 of die 22, the cavities will be in the form of open recesses along the outer surface of filter product 10 (as illustrated in FIG. 5A).

In the above described example, each cavity 50 begins at a radial distance of about 0.125 inches from the inner diameter, $id_p$, i.e., a distance equal to the minimum spacing between the tips of pins 26 and mandrel 14. Furthermore, each cavity has a depth, h, corresponding to the selected length of pin 26 relative to the outer radial surface of roll 24, the selected proximity of the tip of pin 26 relative to mandrel 14 and the thickness of the accumulated fibers at the point of their contact with pins 26. Each cavity also has a shape corresponding to the shape of the penetrating pin 26, e.g., for the example roll 24 described above, each recess 50 has a depth, h, of approximately 0.5 inch and a cylindrical shape with a diameter of approximately 0.062 inch.

Figure 6:
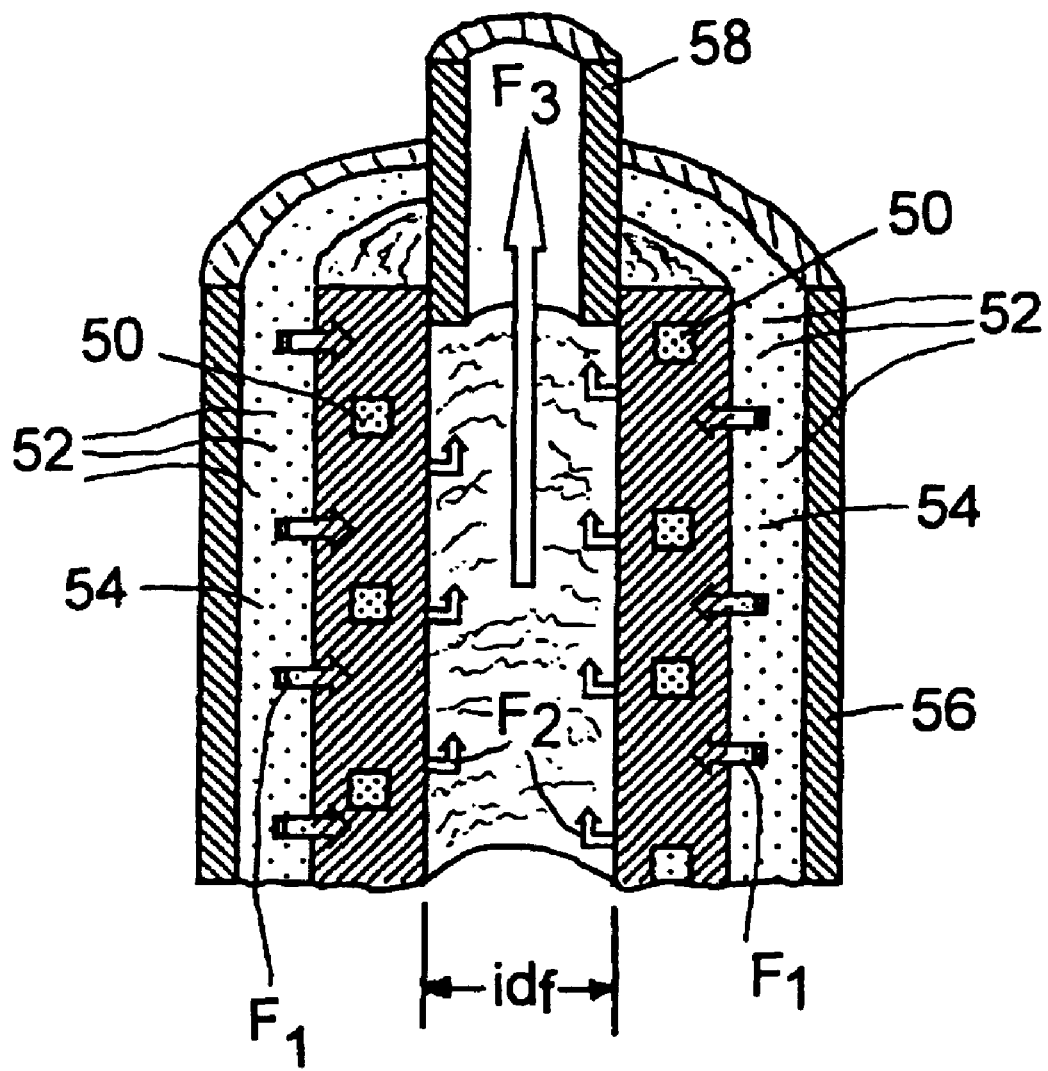
FIG. 6 is an unscaled, cross-sectional, perspective view of a tubular filter product of the invention in use.

Referring now to FIG. 6, a portion of filter product 10 is used to filter particulate matter 52 from a liquid 54. Filter product 10 is placed within an outer conduit 56 while an inner conduit 58 is inserted within inner diameter, $id_p$, of filter product 10. Liquid 54 is forcibly drawn through filter product 10 and up through inner conduit 56 (direction of arrows F1, F2 and F3). As liquid 54 is drawn through filter product 10, fibers 12 of the filter act to entrap particulate matter 52.

Cavities 50 of filter product 10 provide for enhanced filtration characteristics. These cavities have been shown to provide bypass areas for fluid to pass further into the depth of the filter and provide areas for increased amounts of sediment to collect (as illustrated by greater particulate 52 density in cavities 50 of FIG. 6). In this manner, cavities 50 increase the overall sediment (e.g., dirt) holding capacity of the filter proportionally by the number, size and shape of the cavities created during processing. Additionally, the penetration of pins 26 into filter product 10 locally compresses the affected fibers against one another. This compressing action increases the overall collapse strength of filter product 10 by interlocking the affected fibers of the various layers penetrated by pins 26.

A number of embodiments of the invention have been described. Nevertheless, it will be understood that various modifications may be made without departing from the spirit and scope of the invention.

For example, the addition of other devices such as flat or conical smooth rolls, air knives, water jets, water mists, heated platens, ultrasonics, may be used in conjunction with the above described method and apparatus to further enhance the filter and removal method.

Accordingly, other embodiments are within the scope of the following claims.

What is claimed is:

1. A tubular filter product comprising an integral tubular body of melt blown fibers formed by deposit of a plurality of the melt blown fibers upon a rotating support.

said integral tubular body defining an outer surface and an inner surface, and said integral tubular body further defining a pattern of cavities.

2. The tubular filter product of claim 1, wherein said pattern of cavities comprises recesses defined by the melt blow fibers and between melt blown fibers defining said outer surface and melt blown fibers defining said inner surface.

3. The tubular filter product of claim 1 or 2, wherein said pattern of cavities comprises exposed recesses extending into at least one of said inner surface and said outer surface.

4. The tubular filter product of claim 1 wherein said pattern of cavities comprises recesses defined by the melt blown fibers of the integral tubular body, with localized regions of the melt blown fibers defining said recesses having melt blown fiber density per unit volume relatively greater than an average melt blown fiber density per unit volume associated with the tubular filter product.

5. The tubular filter product of claim 1, wherein said cavities are cylindrical and having a diameter of approximately 0.061 inch and the depth of said cavities is approximately 0.5 inch.

* * * * *